United States Patent
Belchior et al.

(10) Patent No.: US 11,980,866 B2
(45) Date of Patent: May 14, 2024

(54) CERAMIC MATERIAL FOR THE ABSORPTION OF CARBON DIOXIDE, PRODUCTION PROCESS, PROCESSES FOR THE REGENERATION OF CARBON DIOXIDE AND OF THE CERAMIC MATERIAL, AND USES

(71) Applicants: PETROLEO BRASILEIRO S.A.—PETROBAS, Rio de Janeiro (BR); UNIVERSIDADE FEDERAL DE MINAS GERAIS, Belo Horizonte (BR); FUNDACAO DE AMPARO A PESQUISA DO ESTADO DE MINAS GERAIS—FAPEMIG, Belo Horizonte (BR); FCA FIAT CHRYSLER AUTOMOVEIS BRASIL LTDA, Betim (BR)

(72) Inventors: Jadson Claudio Belchior, Belo Horizonte (BR); Geison Voga Pereira, Belo Horizonte (BR); Plinio Cesar De Carvalho Pinto, Sao Mateus (BR); Laura Maia De Araujo, Belo Horizonte (BR); Leonardo Schiavo Rezende, Belo Horizonte (BR); Pedro Caffaro Vicentini, Rio de Janeiro (BR); Luciana Neves Loureiro, Rio de Janeiro (BR)

( * ) Notice: Subject to any disclaimer, the term of this patent is extended or adjusted under 35 U.S.C. 154(b) by 165 days.

(21) Appl. No.: 17/417,944

(22) PCT Filed: Dec. 19, 2019

(86) PCT No.: PCT/BR2019/050553
§ 371 (c)(1),
(2) Date: Jun. 24, 2021

(87) PCT Pub. No.: WO2020/132728
PCT Pub. Date: Jul. 2, 2020

(65) Prior Publication Data
US 2022/0072504 A1 Mar. 10, 2022

(30) Foreign Application Priority Data
Dec. 27, 2018 (BR) .......................... 102018077336-4

(51) Int. Cl.
*B01J 20/04* (2006.01)
*B01D 53/62* (2006.01)
(Continued)

(52) U.S. Cl.
CPC ............ *B01J 20/043* (2013.01); *B01D 53/62* (2013.01); *B01D 53/82* (2013.01); *B01D 53/83* (2013.01);
(Continued)

(58) Field of Classification Search
CPC .. B01J 20/043; B01J 20/0229; B01J 20/0281; B01J 20/041; B01J 20/16;
(Continued)

(56) References Cited

FOREIGN PATENT DOCUMENTS

| BR | 102013019137 A2 | 8/2015 |
|---|---|---|
| KR | 20110047302 A | 5/2011 |

OTHER PUBLICATIONS

KR 20110047302 A English translation (Year: 2011).*
(Continued)

*Primary Examiner* — Anita Nassiri-Motlagh (57) ABSTRACT

The present invention describes the process of preparing ceramic materials for absorption of acidic gases, mainly carbon dioxide, in exhaust systems and/or present indoors. Ceramic materials are formed by a mixture of alkali carbonate with alkaline earth metal oxide/hydroxide associated with a binding component, but non-limiting. The alkali carbonate comprises sodium, potassium carbonate, or a
(Continued)

mixture of both. The alkaline earth metal oxide/hydroxide may be formed from magnesium oxide or magnesium hydroxide as well as calcium oxide and/or calcium hydroxide.

17 Claims, 8 Drawing Sheets (51) Int. Cl.
  B01D 53/82 (2006.01)
  B01D 53/83 (2006.01)
  B01J 20/02 (2006.01)
  B01J 20/16 (2006.01)
  B01J 20/28 (2006.01)
  B01J 20/30 (2006.01)

(52) U.S. Cl.
  CPC ....... B01J 20/0229 (2013.01); B01J 20/0281 (2013.01); B01J 20/041 (2013.01); B01J 20/16 (2013.01); B01J 20/28019 (2013.01); B01J 20/28042 (2013.01); B01J 20/3007 (2013.01); B01J 20/3042 (2013.01); B01J 20/3078 (2013.01); B01D 2251/304 (2013.01); B01D 2251/306 (2013.01); B01D 2251/402 (2013.01); B01D 2251/404 (2013.01); B01D 2251/602 (2013.01); B01D 2251/604 (2013.01); B01D 2251/606 (2013.01); B01D 2257/504 (2013.01); B01J 2220/42 (2013.01); B01J 2220/82 (2013.01)

(58) Field of Classification Search
  CPC ............ B01J 20/28019; B01J 20/28042; B01J 20/3007; B01J 20/3042; B01J 20/3078; B01D 53/62; B01D 53/82; B01D 53/83
  USPC .......................................................... 423/230
  See application file for complete search history.

(56) References Cited

OTHER PUBLICATIONS

English translation of International Search Report in International Application No. PCT/BR2019/050553, dated Feb. 3, 2020.
Al-Mamoori, A.; Thakkar, H.; Li, X.; Rownaghi, A.A.; Rezaei, F. "Development of potassium- and sodium-promoted CaO adsorbents for $CO_2$ capture at high temperatures" Industrial & Engineering Chemistry Research, v. 56, No. 29, p. 8292-8300, 2017. Jul. 7, 2017.
Huang, L.; Zhang, Y.; Gao, W.; Harada, T.; Qin, Q.; Zheng, Q.; Hat Ton, T.A.; Wang, Q. "Alkali carbonate molten salt-coated CaO with highly improved $CO_2$ capture capacity" Energy Technology, v. 5, No. 8, p. 1328-1336, 2016. Dec. 5, 2016.
Pawlak-Kruczek, H.; Baranowski, M. "Effectiveness of $CO_2$ capture by calcium looping with regenerated calcium sorbents—last step calcination" Energy Procedia, v. 105, p. 4499-4512, 2017. May 2017.

* cited by examiner

CERAMIC MATERIAL FOR THE ABSORPTION OF CARBON DIOXIDE, PRODUCTION PROCESS, PROCESSES FOR THE REGENERATION OF CARBON DIOXIDE AND OF THE CERAMIC MATERIAL, AND USES

The present invention describes the process of preparing ceramic materials for absorption of acidic gases, mainly carbon dioxide, in exhaust systems and/or present indoors. Ceramic materials are formed by a mixture of alkali carbonate with alkaline earth metal oxide/hydroxide associated with a binding component, but non-limiting. The alkali carbonate comprises sodium, potassium carbonate, or a mixture of both. The alkaline earth metal oxide/hydroxide may be formed from magnesium oxide or magnesium hydroxide as well as calcium oxide and/or calcium hydroxide.

The emission of greenhouse gases, such as methane ($CH_4$), carbon dioxide ($CO_2$), sulphur dioxide ($SO_2$), sulphur trioxide ($SO_3$) and nitrogen oxides as well as hydrocarbon compounds (HC) has caused a number of climate changes that are unfavorable to the maintenance of life. One can mention phenomena such as the prolongation of periods of drought, the formation of catastrophic storms, hurricanes and tornadoes in regions that did not exhibit these types of climatic phenomena, in addition to the global elevation of the temperature of the atmosphere and the oceans. Associated with these climate changes there is also the formation of acid rain that is intensified by the presence of acid gases and the intrinsic pollution found in the form of particulate matter and toxic substances, which become part of the atmosphere that is in direct contact with virtually all aerobic organisms present in the biosphere.

Future climate projections signal the immediate need to implement effective procedures for the control of pollutant gas emissions. The use of environmentally friendly technologies based on solar energy, hydrogen, wind energy, etc. is still below the targets necessary to cause a regression in pollution levels. The use of renewable and carbon-based energy sources, such as ethanol or biodiesel, increases energy efficiency decreasing greenhouse gas emissions, mainly carbon dioxide ($CO_2$), but will always emit an intrinsic amount of $CO_2$ during the burning process, which is inherent to the chemical combustion reaction.

The aim of several technologies dedicated to reducing emissions of polluting gases is to prevent greenhouse gas emissions to the atmosphere through chemical treatments that can immobilize them in a condensed phase (liquid or solid).

Since carbon dioxide is the main pollutant and the biggest aggravating factor of the greenhouse effect, there are several technologies described in the state of the art that propose methods for reducing the emitted amount thereof. In general, these methodologies are focused on two objectives, the first related to the permanent entrapment of $CO_2$ and the second related to the reuse of $CO_2$ for the production of inputs and/or products of industrial interest.

To demonstrate the relevance of the process and the complexity of the absorption of acidic gases produced in combustion systems or present indoor environments, various patents, methodologies and apparatuses can be found in the prior art. Initially, the inventions aimed to absorb toxic gases indoor environments, such as submarines and breathing apparatus with reflux of anesthetic gases. For the purification of air in submarines ($CO_2$ absorption), GB 190603570 (Winand, P.; "Process for the Elimination of Carbon Dioxide from the Gaseous Combustion Products of Combustion Engines", 1906) describes an absorbent mixture of ammonia with sodium oxide or potassium oxide, which are produced during the generation of the oxidant $O_2$, in internal combustion engines that are intended for the propulsion of submarines.

The large-scale application of carbon dioxide absorption processes in indoor environments can be demonstrated by the U.S. Pat. No. 5,087,597 (Orlando, L. et al.; Carbon dioxide adsorbent and method for producing the adsorbent, 1992) with the description of a mixture based on polyalkoxysilane, silica, alumina and iron oxide, which is employed in the absorption of $CO_2$ present in containers for the transport of materials susceptible to decomposition by acidic environment or for the transport of animals.

Another application of great importance corresponds to the absorption of $CO_2$ in gas anesthesia devices. These devices must have a system for absorption of expired $CO_2$ by the patient, however, absorbent materials cannot react with anesthetic substances, as occurs in absorption systems composed of alkali metal oxides. In this case, BR 9713138 (Amstrong, J. R.; Murray, J.; "Carbon dioxide absorber for use in anesthesiology, and preparation process thereof", 1997) proposed replacing the welded lime with a mixture of calcium hydroxide, gypsum and aluminum and a hygroscopic agent (calcium chloride). Similarly, RU 2152251 (Imanenkov, S. I.; Aleksandrova, T. I.; Kulakov, N. I.; Putin, B. V.; "Method of synthesis of carbon dioxide adsorbent", 2000) describes the use of a mixture of calcium hydroxide and potassium carbonate for $CO_2$ absorption in breathing apparatus.

For industrial applications absorption processes can be carried out in more diversified ways, as, for example, is described in BR 0306705 (Johannes, B. T. and colleagues; Process for removing carbon dioxide from gas mixtures", 2004) which shows the use of a mixture composed of water, sulfolane and a secondary or tertiary amine derived from ethanolamine. The absorption process is carried out by spraying the absorbent solution against the gas stream containing $CO_2$, $H_2S$ and/or COS. The described process should preferably be carried out at a temperature between 50° C. and 90° C. For the absorption of $CO_2$ in gas streams, at room temperature or up to approximately 100° C., although efficient the amines used suffer constant degradation during the process, thus raising the costs of capture.

Several patents can be found describing the use of zeolites in specific apparatuses, such as, for example, U.S. Pat. No. 5,531,808 (Ojo A. F.; Fitch, F. R; Buelow, M.; "Removal of carbon dioxide from gas streams", 1996) using zeolite-X and EP 0173501 (Keith, P. G.; "Process for removing carbon dioxide from gas mixtures", 1986) using zeolite-A. The processes of absorption of $CO_2$ through Zeolites are limited by the temperature range due to the weak interaction that the zeolite exhibits with absorbed $CO_2$.

In the natural environment part of the carbon present on the planet is fixed in the form of carbonated sediments, composed mainly of metal carbonates. Following this principle, several patents describe materials based on metal compounds that produce their respective metal carbonates for capturing $CO_2$. As an example, WO 2017124151 (T. Reid; "Method and apparatus for removing carbon dioxide from flue gas"; 2017) describing a fluid/slurry material composed of a heterogeneous mixture of magnesium carbonate and calcium hydroxide in water, capable of absorbing $CO_2$ streams at temperatures between 55 and 90° C. Another example of using metal compounds for $CO_2$ absorption corresponds to patent BR 102013019137 (G. M. de Lima, F.

V. de Andrade, R. de Oliveira, "Solid carbon dioxide absorbing materials and their preparations", 2013) which describes a material composed of calcium hydroxide, magnesium hydroxide, aluminum hydroxide, iron oxide Ill, and sodium bicarbonate, which is degraded into sodium carbonate to form pores in the material that will be used to absorb $CO_2$ in the temperature range of between 300 and 550° C. Another patent also based on the use of calcium corresponds to US2015125368 (J. C. Belchior; G. M. De Lima; G. P. Voga; R. De Oliveira; W. R. Fonseca; F. V. De Andrade; "Ceramic materials for absorption of acidic gases, process of preparing thereof and cyclic process for absorption and regeneration of acidic gases"; 2015) which uses a pelletized compound based on calcium and magnesium oxide to absorb dry or wet $CO_2$ in the temperature range between 300 and 600° C.

Patent document KR101155303, 2009, entitled "$CO_2$ sorbent and manufacturing method thereof", corresponds to a mixture containing at least six classical components such as: binding agent, absorbing agents, regenerating agent, dispersant, antifoamer and organic binders. The absorbing agent, based on potassium carbonate corresponds to 10% of the material and the other components are inert relative to the $CO_2$ flux. The material is prepared in a sprayer and undergoes a calcination process (350-1,000° C.). The material is used in powder form and the absorption temperature is between 50 and 110° C. and the regeneration process occurs between 100 and 200° C. The production process is complex and costly, requiring several complex steps.

In the present invention, the absorbent material comprises more than 90% calcium oxide or hydroxide, which enables absorption of $CO_2$ above 45% of the initial mass of the absorbent at temperatures above 300° C. This enables efficient absorption of $CO_2$ at high temperature without the need for cooling in cases where $CO_2$ is emitted at temperatures above 500° C. In addition, the process of preparing the material is simpler and cheaper. Mixing of reagents with water, mechanical or manual molding and drying of the final product at 80° C. are required. The incorporation of substances such as phosphate, ammonium and magnesium ions, which promote the mechanical resistance and sintering resistance of the material is carried out in a small amount but ensures the high efficiency of the material in the absorption of $CO_2$ in various cycles of absorption/regeneration without losing its physical properties.

The use of calcium hydroxide/oxide has been shown to be a component frequently present in various combinations of materials and apparatuses, mainly due to the high affinity of calcium for the formation of carbonate. However, such technologies face a restriction of use, which is mainly related to the energy cost for the regeneration of the absorbent material, since the thermal degradation of calcium carbonate only occurs above 800° C.

The present invention describes a novel formulation of compounds based primarily on magnesium oxide/hydroxide and alkali carbonates termed ATA150 (alkaline earth oxide and alkali carbonate) for absorption of carbon dioxide in gas streams having a temperature between 25 and 150° C. The combination of the mixture between alkaline earth metal oxide/hydroxide and alkali carbonate enables the increase of the rate of reaction of carbonate formation of the alkaline earth metal, through an intermediate reaction between the carbon gas stream and the alkali carbonate formed the chemical species hydrogen carbonate that reacts rapidly with the alkaline earth metal oxide/hydroxide.

DETAILED DESCRIPTION OF THE TECHNOLOGY

The present invention describes the process of preparing ceramic materials for absorption of acidic gases, mainly carbon dioxide, released into exhaust systems and/or that present indoors. The ceramic materials are formed of an absorbing agent, composed of a mixture of alkali carbonate with alkaline earth metal oxide/hydroxide, associated with a binding agent. The alkali carbonate comprises sodium, potassium carbonate, or a mixture of both. The alkaline earth metal oxide/hydroxide may be formed from magnesium oxide or magnesium hydroxide as well as calcium oxide and/or calcium hydroxide.

The proposed process for obtaining the ceramic material comprises the following steps:

a. Solubilizing between 23 g and 360 g preferably 87 g of the alkali carbonate ($Na_2CO_3$ and/or $K_2CO_3$) in 500 to 1,000 mL of water;
b. Adding 200 g to 800 g, preferably 300 g of alkaline earth metal oxide or hydroxide;
c. Adding the binding agent;
d. Homogenizing the mixture obtained in step "c" for 5 to 30 minutes, preferably 10 minutes, obtaining a uniform pasty consistency;
e. Removing and optionally molding the dough obtained in step "d" between 1 to 3 hours, preferably 1 hour;
f. Drying the material at a temperature between 50° C. and 150° C., preferably 80° C., for a period of between 3 and 48 hours, preferably 24 hours.

In step "b" of the process, the absorbing agent comprising alkaline earth metal should be selected from the group comprising: magnesium oxide (MgO), magnesium hydroxide ($Mg(OH)_2$), calcium oxide (CaO) and calcium hydroxide ($Ca(OH)_2$).

In step "c" of the process, the binding agent should be selected from the group comprising: calcium oxide (CaO), Portland cement, calcium sulfate ($CaSO_4$) and ferrous sulfate ($FeSO_4$).

In step "f" of the process heating must occur in the presence of nitrogen and in the absence of air and carbon dioxide, in a closed chamber.

The absorption process may occur in a bed filled with the pre-molded solid material or in a fluidized bed with excess water.

The proposed process for regeneration of the absorbent ceramic material comprises the following steps:
a. Thermally decomposing the saturated absorbent ceramic at a temperature of 350° C. to 800° C. for a period between 2 and 8 hours for release of the acid gas;
b. Cooling the ceramic material at a temperature between 30 and 100° C., preferably 80° C.;
c. Adding water under constant stirring to correct moisture content between 7 and 30%, preferably 17%, of the absorbent material.

In step "a", the temperature for the release of $CO_2$ should preferably be 450° C., for a period between 2 and 8 hours.

Optionally, during step "a", it is possible to take advantage of the released acid gas by conducting the same to the processing systems of industrial interest.

The present invention also proposes the ceramic material obtained from one of the above processes.

The ceramic material (fresh or regenerated) for carbon dioxide absorption can be shaped in any shape, including compact block, hollow block (brick) or pelletized material.

Additionally, the invention features the use of absorbent ceramic material which, by presenting basic character, allows its use in acid gas absorption processes such as carbon dioxide ($CO_2$), nitric oxide (NO), nitrogen dioxide ($NO_2$), sulfur dioxide ($SO_2$), sulfur trioxide ($SO_3$), non-limiting.

Finally, the invention also proposes the use of the absorbent ceramic material as a source of carbon dioxide and other acid gases. Because saturated absorbent ceramics have a high concentration of acid gases, especially carbon dioxide, gases can be compressed for commercialization as chemical reagents or in other industrial processes that employ gaseous $CO_2$ or other acid gases.

The present invention may be better understood according to the non-limiting examples described below.

Example 1—Method of Synthesis, Application and Absorption Mechanism of a Ceramic Material Formed by Alkaline Earth Metal Oxide or Hydroxide with an Alkali Metal Carbonate being Able to be Associated with One or More Binder Components These materials have the ability to interact with carbon dioxide in a temperature range between 30 and 150° C. forming the respective alkaline earth metal carbonate. After saturation of the material, it can be thermally regenerated by raising the temperature until decomposition of the alkaline earth carbonate.

The combination of the mixture between alkaline earth metal oxide/hydroxide and alkali carbonate enables the increase of the rate of reaction of carbonate formation from the alkaline earth metal, through an intermediate reaction between the carbon gas stream and the alkali carbonate formed the chemical species hydrogen carbonate that reacts rapidly with the alkaline earth metal oxide/hydroxide. To exemplify the efficacy of this reaction mechanism, exposure of magnesium oxide with a constant flow of pure $CO_2$ in the temperature range between 25 and 500° C. does not result in any formation of magnesium carbonate, as can be seen with calcium oxide. However, performing this same process with the presence of sodium or potassium carbonate promotes the stoichiometric conversion of all magnesium in the form of oxide or hydroxide to carbonate.

The absorption process occurs in two steps. First $CO_2$ is captured by an alkali metal carbonate, forming the hydrogen carbonate ion ($HCO_3^{-2}$) according to equations 1, 2 and 3:

$$K_2CO_3(s) \rightarrow 2K^+(aq) + CO_3^{+2}(aq) \quad Na_2CO_3(s) \rightarrow *2Na^+(aq) + Co_3^{-2}(aq) \qquad \text{eq. 1}$$

$$CO_3^{-2} + H_2O + \leftrightarrow HCO_3^- + OH^- \qquad \text{eq. 2}$$

$$CO2(g) + OH^- \rightarrow HCO_3^- \qquad \text{eq. 3}$$

In this sequence the alkali carbonate ($Na_2CO_3$ or $K_2CO_3$) is dissolved (eq. 1) by the water present in the material and in the exhaust gas flow, then the carbonate ion reacts with water (eq 2) forming a chemical system in equilibrium with the bicarbonate ion, the last reaction involves the capture of carbon dioxide by the reaction with the hydroxyl present in the medium forming another bicarbonate ion (eq. 3).

Parallel to the formation of bicarbonate ions in the system, alkaline earth metal oxide or hydroxide reacts with the bicarbonate present in the system by shifting the chemical equilibrium to the alkaline carbonate formation reaction (eq. 2). In this way the carbonate ↔ bicarbonate system (eq 2) functions as a fast-acting stock that makes bicarbonate available to interact with the alkaline earth metal source (CaO, $Ca(OH)_2$, MgO or $Mg(OH)_2$) (eq. 4).

$$HCO_3^- + Ca(OH)_2 \rightarrow CaCO_3 + H_2O$$

$$HCO_3^- + Mg(OH)_2 \rightarrow MgCO_3 + H_2O \qquad \text{eq. 4}$$

The present invention proposes a set of absorbent mixtures generically referred to as ATA150, each formulation comprising at least one alkaline earth metal oxide or hydroxide may be: MgO, $Mg(OH)_2$, CaO or $Ca(OH)_2$ associated with an alkali metal carbonate may be: $Na_2CO_3$, $K_2CO_3$. To give cohesion and mechanical strength one can add a binding agent which can be: polystyrene, cement or calcium phosphate. The composites formulated in this invention have the ability to absorb $CO_2$ in gas streams having temperatures between 30 and 150° C. Table 1 ranges for ATA150 material formulations shows the concentration ranges of each component for the various compositions elaborated in this invention.

TABLE 1

| | ranges for ATA150 material formulations | | | | | | | | |
|---|---|---|---|---|---|---|---|---|---|
| | Alkaline earth metal oxide/hydroxide | | Alkaline metal carbonate | | Binders | | | | Ratio (kg/ |
| Formulations | MgO/ Mg(OH)$_2$ | CaO/ Ca(OH)$_2$ | Na$_2$CO$_3$ | K$_2$CO$_3$ | Polystyrene | Cement | CaSO$_4$ | FeSO$_4$ | kg(CO$_2$) |
| F1 | 70%-97% | — | 30%-3% | — | — | — | — | — | 0.93-1.47 |
| F2 | 70%-97% | — | — | 30%-3% | — | — | — | — | 0.94-1.84 |
| F3 | 70%-97% | — | 30%-3% | — | — | 3%-15% | — | — | 0.96-1.59 |
| F4 | 70%-97% | — | — | 30%-3% | — | 3%-15% | — | — | 0.97-1.95 |

TABLE 1-continued ranges for ATA150 material formulations

| Formulations | Alkaline earth metal oxide/hydroxide | | Alkaline metal carbonate | | Binders | | | | Ratio (kg/kg(CO$_2$)) |
|---|---|---|---|---|---|---|---|---|---|
| | MgO/Mg(OH)$_2$ | CaO/Ca(OH)$_2$ | Na$_2$CO$_3$ | K$_2$CO$_3$ | Polystyrene | Cement | CaSO$_4$ | FeSO$_4$ | |
| F5 | 70%-97% | — | 30%-3% | — | — | — | 3%-10% | — | 0.96-1.55 |
| F6 | 70%-97% | — | — | 30%-3% | — | — | 3%-10% | — | 0.98-2.33 |
| F7 | 70%-97% | — | 30%-3% | — | — | — | — | 1%-10% | 0.94-1.55 |
| F8 | 70%-97% | — | — | 30%-3% | — | — | — | 1%-10% | 0.98-1.93 |
| F9 | 70%-97% | 3-15% | 30%-3% | — | — | — | — | — | 0.95-1.56 |
| F10 | 70%-97% | 3-15% | — | 30%-3% | — | — | — | — | 0.97-1.93 |
| F11 | — | 70%-97% | 30%-3% | — | — | — | — | — | 1.70-2.13 |
| F12 | — | 70%-97% | — | 30%-3% | — | — | — | — | 1.71-2.14 |
| F13 | — | 70%-97% | 30%-3% | — | — | 3%-10% | — | — | 1.73-2.28 |
| F14 | — | 70%-97% | — | 30%-3% | — | 3%-10% | — | — | 1.74-2.43 |
| F15 | — | 70%-97% | 30%-3% | — | — | — | 3%-10% | — | 1.73-2.28 |
| F16 | — | 70%-97% | — | 30%-3% | — | — | 3%-10% | — | 1.74-2.43 |
| F17 | — | 70%-97% | 30%-3% | — | — | — | — | 1%-10% | 1.71-2.28 |
| F18 | — | 70%-97% | — | 30%-3% | — | — | — | 1%-10% | 1.72-2.43 |

The synthesis process of the various formulations for the ATA150 material follows a standardized procedure. First the alkali carbonate (Na$_2$CO$_3$ or K$_2$CO$_3$) is diluted in water in a ratio of (1,830±200) ml of water to each per kg of alkaline earth metal oxide/hydroxide, then the oxide/hydroxide is added to the solution together with the binding agent. This mixture is homogenized for approximately 10 minutes, but not limiting, until it acquires a uniform pasty consistency (without the presence of granules), then the mixture can be molded or placed in an extruder. The dough acquires consistency to demold between 1 and 3 hours, then the material can be dried at a temperature between 50 and 150° C. or further stored with moisture.

The process of absorption of CO$_2$ by the ATA150 material is intrinsically dependent on the presence of water, as shown in eq. 1 and 2, in this way, the inclusion of water can be obtained in two ways: the gas flow itself can contain moisture/or the material can be humidified with a content between 10 and 20%, but not limiting, to activate the eq reactions. 1 and eq. 2. The absorption process may occur in a bed filled with the preformed solid material or in a fluidized bed with excess water. In both cases the rate of absorption process is defined by the combination of two processes, the conversion rate of alkali carbonate to bicarbonate and the conversion rate of alkali bicarbonate to alkaline earth carbonate. Initially, the high availability of alkali carbonate and alkaline earth oxide maintains the absorption process at a higher rate. Initially the rate of formation of alkaline earth carbonate (HCO$_3^-$→MgCO$_3$) due to high availability of alkaline earth metal. However, after the kinetic equilibrium of reactions 1 and 2, the rate of bicarbonate formation becomes higher, generating a stock of bicarbonate that guarantees its conversion as long as alkaline earth metal is available.

Within the list of proposed formulations (Table 1) for the ATA150 material described in this patent, compositions containing MgO (Formulations F1 to F10) as source of alkaline earth metal and sodium carbonate as source of alkali carbonate are more industrially relevant due to the possibility of obtaining a theoretical yield of approximately 1:1 (m/m), this ratio represents the best mass ratio of CO$_2$ captured per mass of absorbent material. Calcium-containing formulations have a higher mass ratio of absorbent material per captured mass, between 1.72 and 2.43, i.e. consuming more mass per captured C02 unit.

The absorbent material described in this patent application has a basic character, allowing its use in acid gas absorption processes such as carbon dioxide (CO$_2$), nitric oxide (NO), nitrogen dioxide (NO$_2$), sulfur dioxide (SO$_2$), sulfur trioxide (SO$_3$), non-limiting. Although all the gases mentioned promote climatic aggravation, carbon dioxide is the main pollutant, mainly due to the high amount produced in industries that use combustion processes. In this way, CO$_2$ will be used in examples of the functionalities of the ATA150 material and efficiency of the absorption process to reduce greenhouse gas emissions, and subsequent use of the material formed, in order to regenerate the absorbent ceramics and generate important products of high added value for various industrial sectors. The regeneration process of the ATA150 material corresponds to another characteristic that favors the use of magnesium-containing formulations that exhibit a regeneration temperature between 350 and 450° C., the lower temperature range being obtainable by reducing the partial pressure of CO$_2$ in the atmosphere of the regeneration reactor. For compositions containing calcium (F11 to F18) the regeneration temperature is between 650 and 850° C.

Carbon dioxide formed from saturated absorbent ceramics has a high concentration, enabling several industrial methods. Initially, the carbon dioxide itself can be compressed and bottled for later commercialization as a chemical reagent, or in different processes that use gaseous CO$_2$.

To demonstrate the absorption potential, 5 test formulations were selected and will be presented in the following examples. The first 4 formulations are composed of magnesium oxide and sodium carbonate, distinguished only by the use of the binder component, Formulation 1 corresponds to the reference material (standard sample—A1), Sample 2 (A2) which corresponds to a formulation F5 of Table 1 and contains CPIII cement as binder, Sample 3 (A3) which contains CaO as binder, which despite being an absorbing agent, the formation of calcium carbonate promotes the stiffening of the mass. Sample 4 (A4) contains, Fe$_2$(SO$_4$)$_3$. Example 5 corresponds to calcium oxide content formulation as absorbing agent and potassium carbonate.

For samples A1, A2, A3 and A4 absorption tests were performed at different temperatures in the range 90 to 150°

Figure 1:
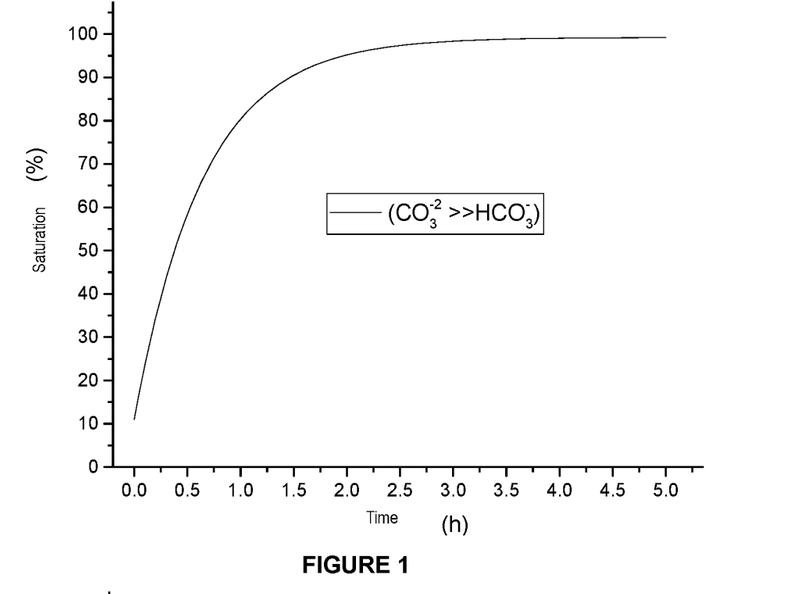
FIG. 1 shows the graph of bicarbonate saturation in the absorption system.
Figure 2:
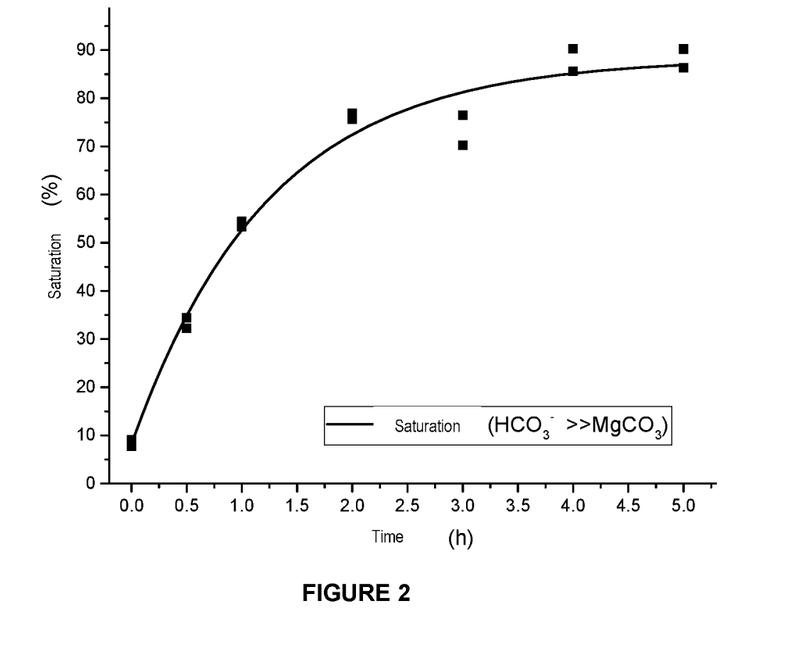
FIG. 2 shows the saturation of $MgCO_3$ in formulation F1 (Table 1 below).
Figure 3:
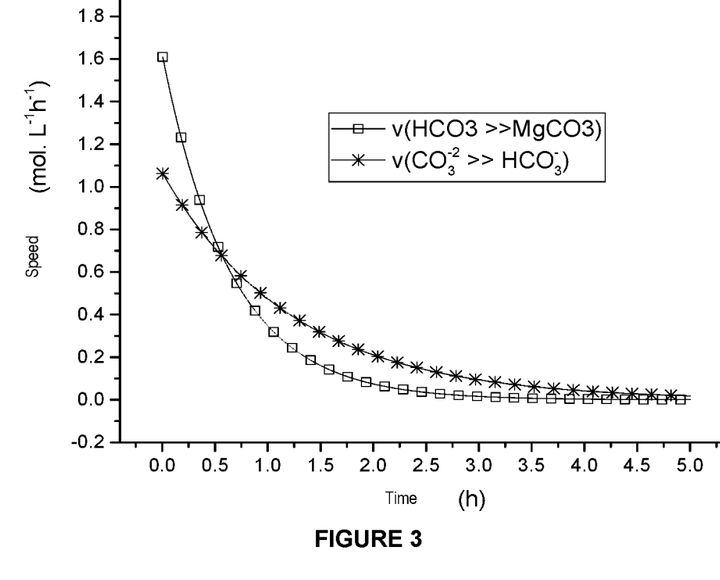
FIG. 3 shows the bicarbonate formation velocity and magnesium carbonate formation velocity.
Figure 4:
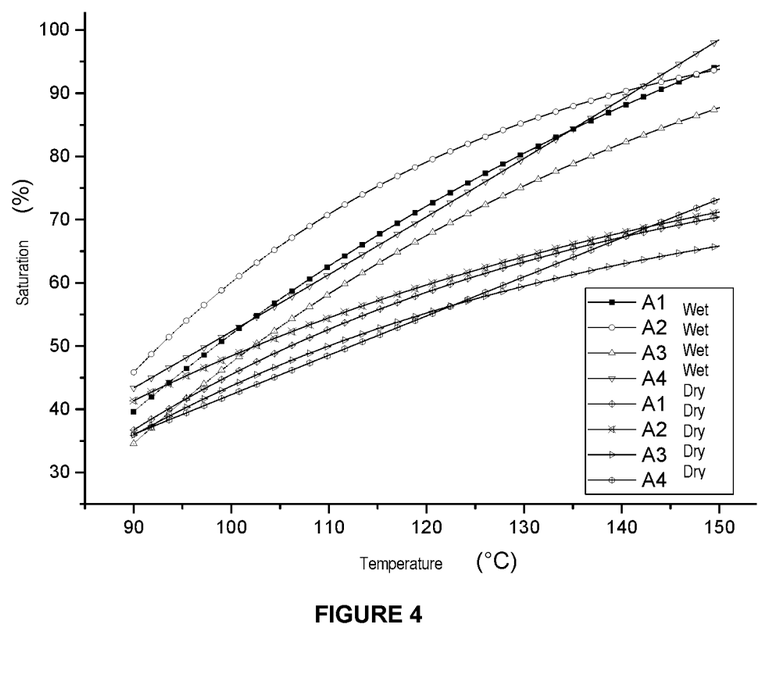
FIG. 4 shows the saturation rate at 5 hours of absorption for the samples described in the examples.

C. using dry and wet samples from each formulation, FIG. 4 shows the saturation of each formulation monitored for 5 hours of absorption with a flow of 400 mL/min $CO_2$. The dry samples have a lower absorption potential, around 70%, in contrast the wet samples obtained a saturation between 86% and 96%, this difference is promoted only by the availability of water for the realization of the alkali bicarbonate formation reaction (eq. 2).

Example 2—Preparation of Absorbent Material with $MgO+Na_2CO_3$ (Sample 1—A1) and Absorption Tests The most basic formulation of the ATA150 material contains only the active components of the absorption process: MgO and $Na_2CO_3$. For the preparation of approximately 500 g of absorbent material it is necessary: 300 grams of MgO; 87 g of $Na_2CO_3$; 550 mL of water.

First $Na_2CO_3$ is diluted in water, then MgO is added to the solution and homogenized for approximately 10 minutes, but not limiting, until the mass reached a uniform consistency. The mass was placed in semi-spherical shapes of 1 cm in diameter for 2 hours, but not limiting, at room temperature. For the production of the dry material, the semi-spheres are taken to the oven for 24 hours at a temperature of 80° C.

The absorption test was performed in the temperature range of 130° C.±10° C., in this range the material is close to the most accelerated kinetics, as shown by FIG. 4. This range allows a number of industrial applications, but mainly the use of the ATA150 for $CO_2$ absorption in combustion engines, such as vehicles.

Figure 5:
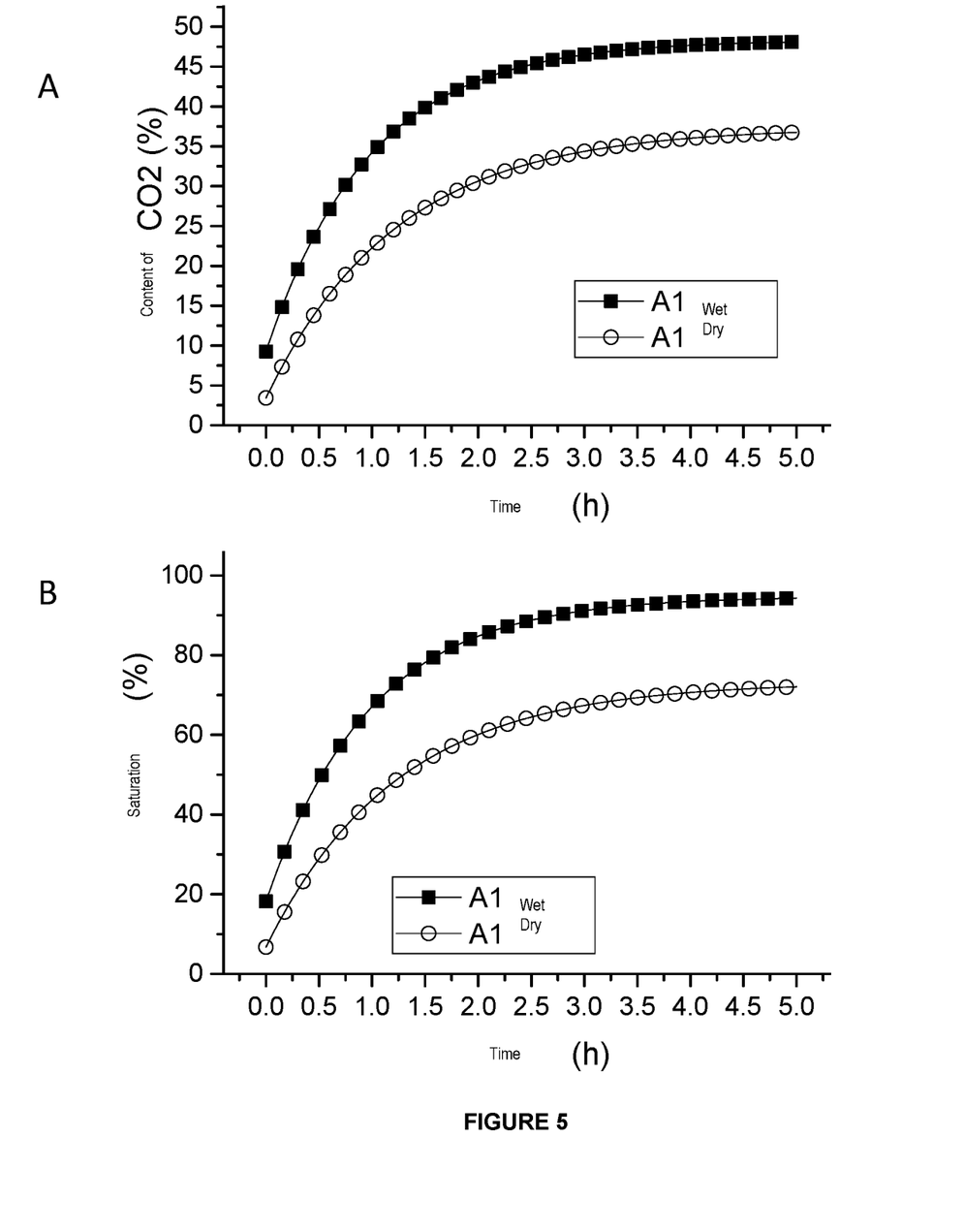
FIG. 5 shows the captured $CO_2$ content (A) and saturation (B) of material A1 ($MgO+Na_2CO_3$) at a temperature of 130±10° C.

The dry sample 1 has a hardness between 30 and 40N, and after saturation the hardness is taken to values between 70 and 108N. For the wet sample, the fracture test cannot be performed since the material still has a pasty consistency, however resistant enough to be manipulated and subjected to absorption tests. Relating to the absorption capacity (FIG. 5), the dry sample has a slower absorption kinetics than the wet sample, this kinetic difference stems from the unavailability of water to react and transport the bicarbonate to the innermost layers of the material, which despite continuing to react, demonstrates a stabilization around 35% $CO_2$ content which corresponds to a saturation of 60% relative to the theoretical value, in contrast the wet material reaches a saturation of 96% with a $CO_2$ content of 50%. Although excess moisture is a favorable characteristic to the absorption process, such property will be defined by the industrial application to which the ATA150 material will be applied.

Example 3—Preparation of Absorbent Material with $MgO+Na_2CO_3+CPIII$ Cement (Sample 2—A2) and Absorption Tests In this example, the ATA150 material formulation contains the following components: 300 grams MgO; 87 g $Na_2CO_3$; 15 g cement; 550 mL water.

First $Na_2CO_3$ is diluted in water, then MgO and Cement are added to the solution. The mixture is homogenized for approximately 10 minutes, but not limiting, until the dough reaches a uniform consistency. The dough was placed in 1 cm diameter semi-spherical shapes for 2 hours, but not limiting, to room temperature. For the production of the dry material, the semi-spheres are taken to the oven for 48 hours at a temperature of 80° C.

Figure 6:
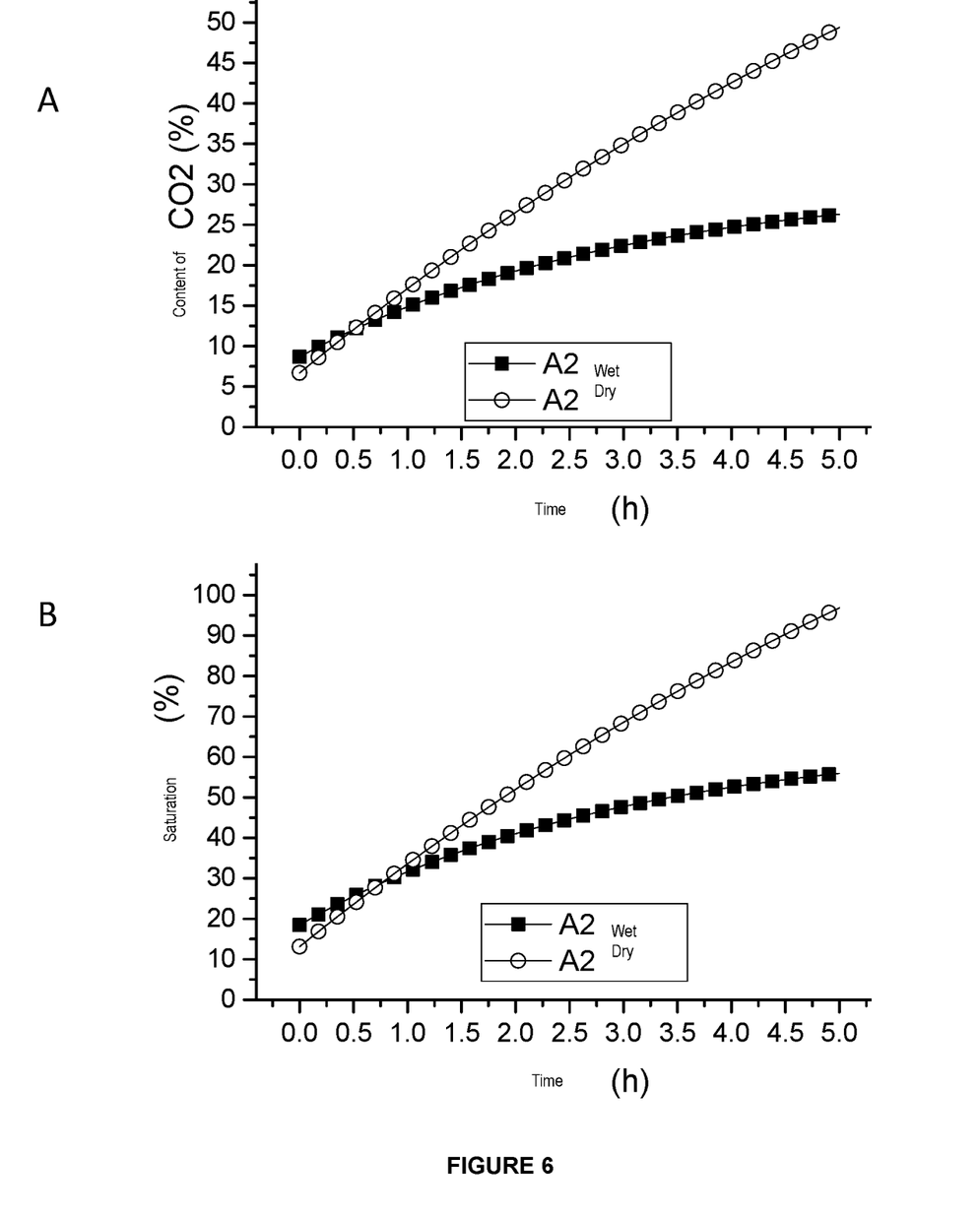
FIG. 6 shows the captured $CO_2$ content (A) and saturation (B) of the A2 material ($MgO+Na_2CO_3+CPIII$ Cement) at a temperature of 130±10° C.

The dry sample 2 has a hardness between 30 and 40N, and after saturation the hardness is taken to values between 40 and 50N. For the wet sample similar to sample 1, a hardness for fracture was not defined since the material still has a pasty consistency. The absorption process in the wet sample is considerably more favored, as can be seen in FIG. 6, while the wet sample has a quasi-linear behavior, reaching the saturation of 97% in 5 hours of absorption, the dry sample presents the typical asymptotic behavior, and in approximately 3 hours the absorption kinetics of the dry sample is considerably reduced, remaining with a $CO_2$ content between 25 and 30% with a maximum saturation of 55%

Example 4—Preparation of Absorbent Material with $MgO+Na_2CO_3+FeSO_4$ (Sample 3—A3) and Absorption Tests In this example, the formulation (A3) of ATA150 material formulation contains the following components: 300 grams MgO, 87 g $Na_2CO_3$; 30 g $FeSO_4.5H_2O$ or $FeSO_4.7H_2O$ and 550 mL water First $Na_2CO_3$ is diluted in water, then MgO and $FeSO_4$ are added to the solution, the mixture is homogenized for approximately 10 minutes, but not limiting, until the dough reaches a uniform consistency. The dough was placed in 1 cm diameter semi-spherical shapes for 2 hours, but not limiting, to room temperature. For the production of the dry material, the semi-spheres are taken to the oven for 48 hours at a temperature of 80° C.

Figure 7:
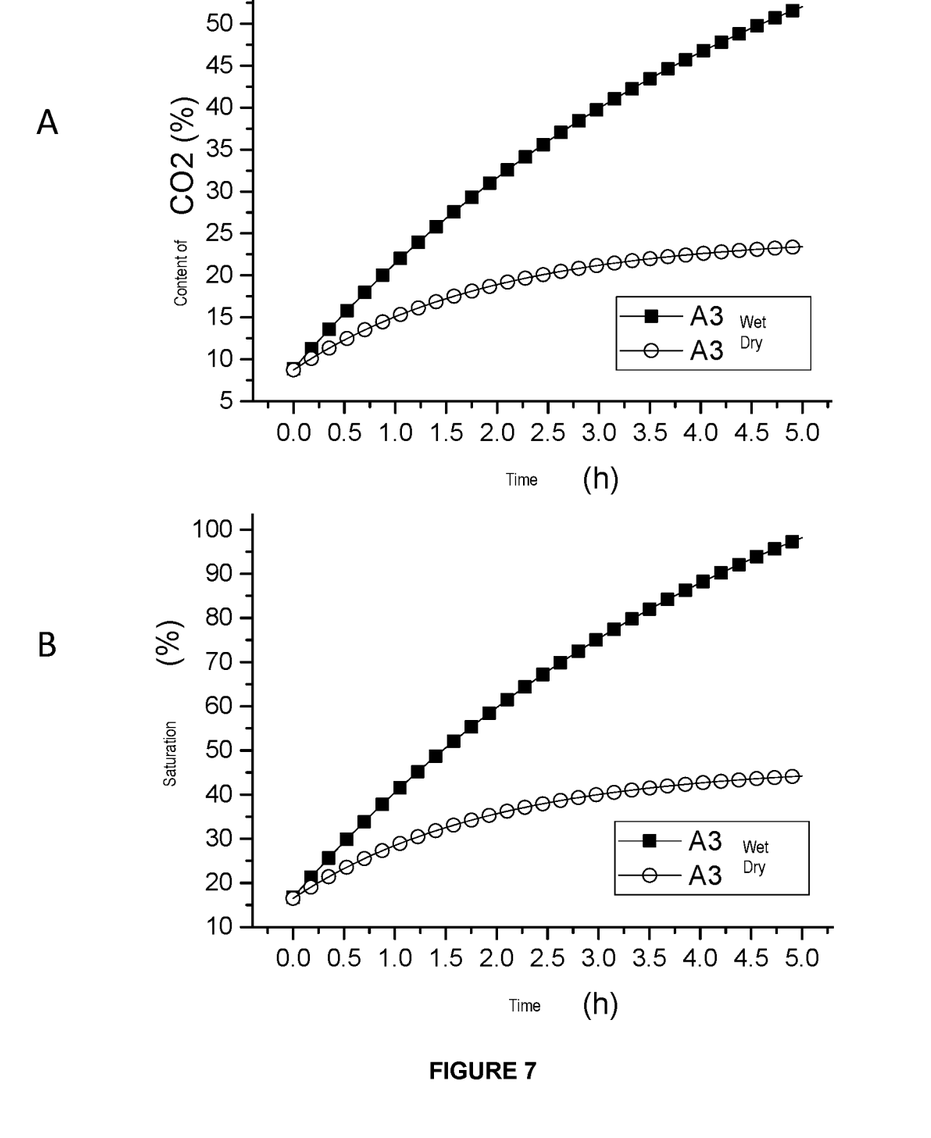
FIG. 7 shows the captured $CO_2$ content (A) and saturation (B) of the A4 material ($MgO+Na_2CO_3+FeSO_4$) at a temperature of 130±10° C.

Samples containing $FeSO_4$ have higher mechanical strength, because the structure of the $FeSO_4$ component functions as gypsum ($CaSO_4$) generating a rigid structure, even with high moisture content. Sample 3 dried before the absorption process has a resistance between 70 and 120N, after saturation the resistance remains in the same range. The absorption process of samples 3 dry and sample 3 wet resembles the other samples, however for the wet sample the presence of a binding agent does not seem to influence the absorption process, reaching 90% saturation (FIG. 7), but for sample 3 dry the presence of $FeSO_4$ binder resulted in 43% saturation.

Example 5—Preparation of Absorbent Material with $MgO+Na_2CO_3+CaO$ (Sample 4—A4) and Absorption Tests In this example, formulation (A4) of ATA150 material contains the following components: 300 grams of MgO, 87 g of $Na_2CO_3$; 39 g of CaO or 51 g of $Ca(OH)_2$, 600 mL of water.

First $Na_2CO_3$ is diluted in water, then MgO and CaO are added to the solution, the mixture is homogenized for approximately 10 minutes, but not limiting, until the dough reaches a uniform consistency. The dough was placed in 1 cm diameter semi-spherical shapes for 2 hours, but not limiting, to room temperature. For the production of the dry material, the semi-spheres are taken to the oven for 48 hours at a temperature of 80° C.

Figure 8:
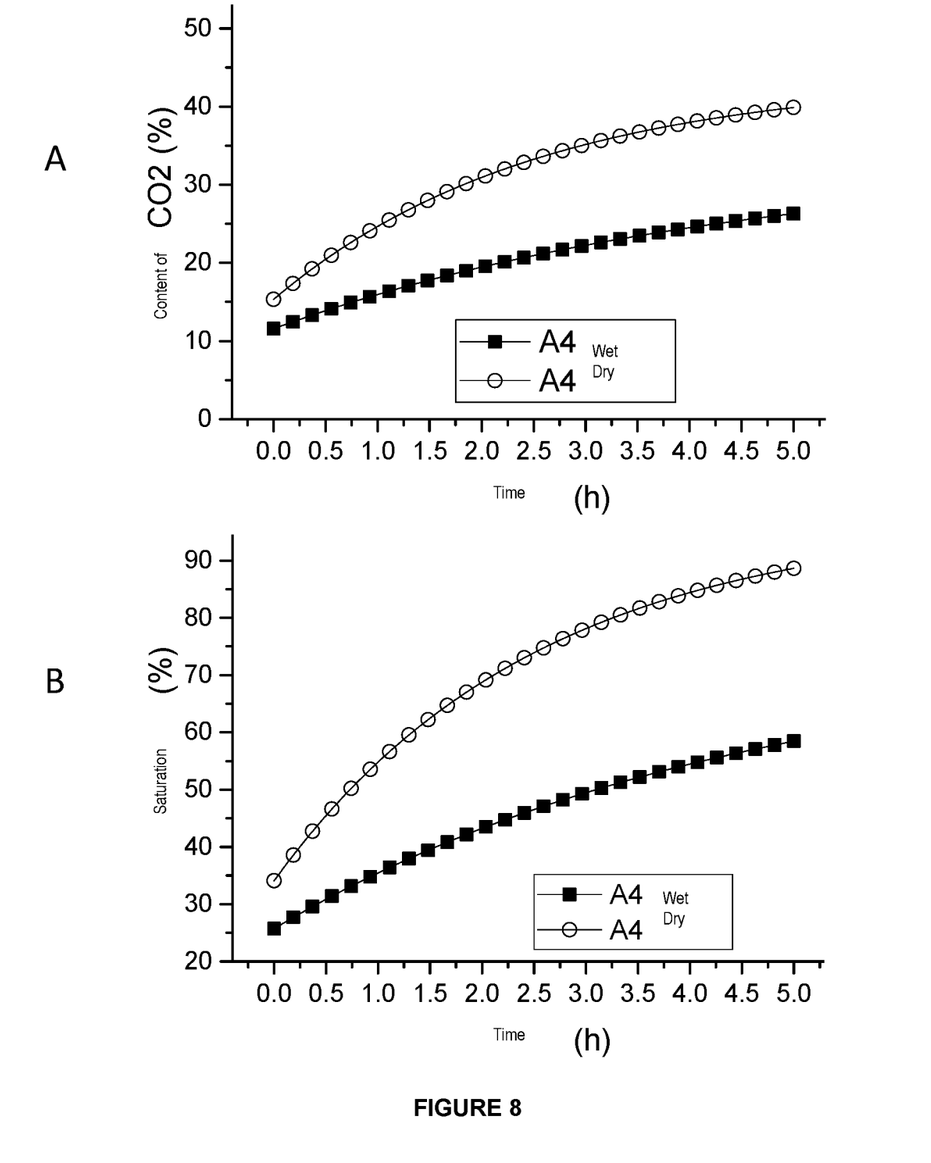
FIG. 8 shows the captured $CO_2$ content (A) and saturation (B) of material A3 ($MgO+Na_2CO_3+CaO$) at a temperature of 130±10° C.

Samples containing CaO as binding agent have an initial hardness of 30N, however after its storage for one month the hardness was increased to 45N, this change is caused by the formation of calcium carbonate generated by the reaction of atmospheric $CO_2$ with the material. After saturation, the final hardness was in the range of 50 N to 70 N. The presence of CaO also influenced the saturation process, due to atmospheric absorption the initial content that was 10% $CO_2$ became 18% (FIG. 8), in the wet sample, which although it obtained a saturation of 86% (FIG. 8), its initial load corresponded to 35% of the absorption potential.

Example 6—Preparation of Absorbent Material with CaO+$K_2CO_3$ (Sample 5—A5) and Absorption Tests In this example, formulation (A5) of the ATA150 material contains the following components: 414 grams CaO; 85 g $K_2CO_3$; 750 mL water.

First $K_2CO_3$ is diluted in water, then CaO is added to the solution and homogenized for approximately 10 minutes, but not limiting, until the mass acquires a uniform consistency. The dough was placed in 1 cm diameter semi-spherical shapes for 2 hours, but not limiting, to room temperature. For the production of the dry material, the semi-spheres are taken to the oven for 48 hours at a temperature of 80° C.

Figure 9:
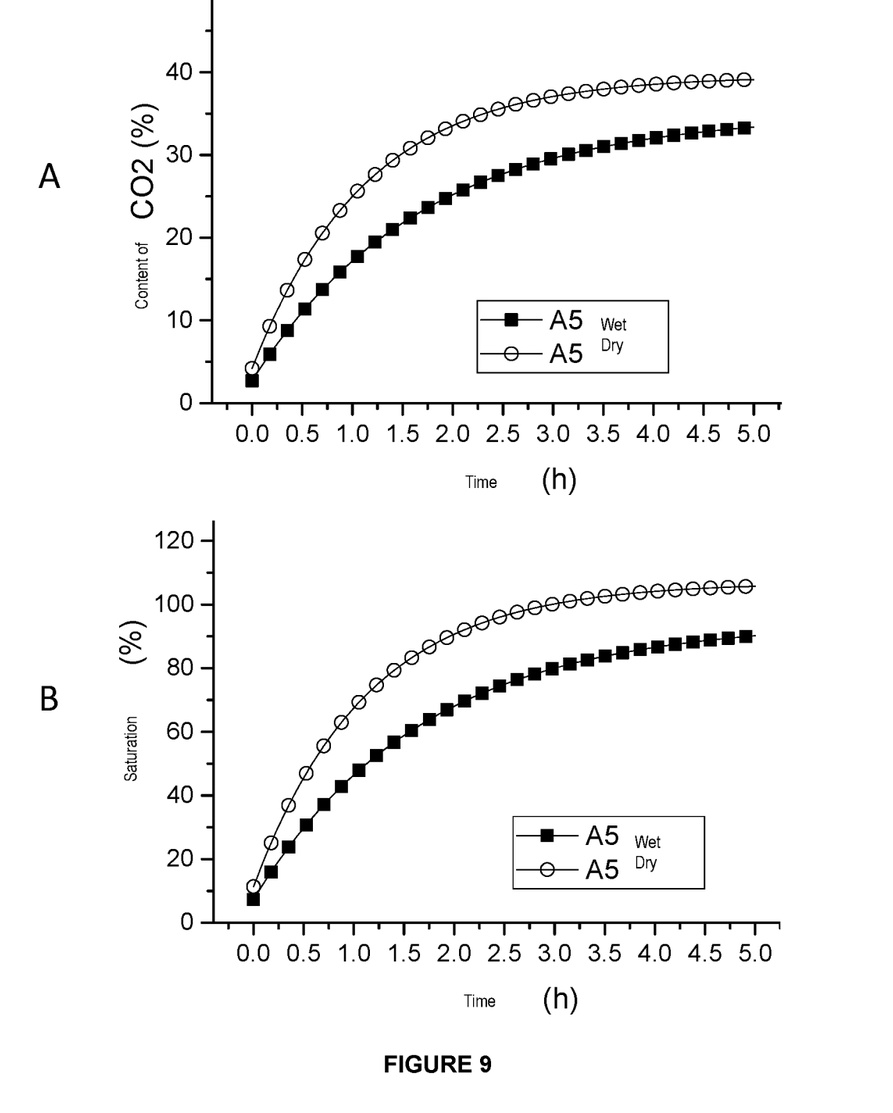
FIG. 9 shows the captured $CO_2$ content (A) and saturation (B) of the A5 material ($CaO+K_2CO_3$) at a temperature of 130±10° C.

The strength of the CaO-containing material initially is between 40N and 60N, however, for the saturated material the strength increases significantly, passing to a range between 90N and 150N. The absorption process is similar to samples containing MgO, but the absorption kinetics is faster, since the reaction of calcium carbonate formation from bicarbonate is favored by the increase of the $CaCO_3$ lattice energy. This characteristic reflects the speed of the process (FIG. 9), since in 3 hours of absorption both the dry and wet sample are close to the final saturation of the process, which results in final saturation of 86% and 99% for the dry and wet sample.

Example 7—Absorbent Material Regeneration Process

Figure 10:
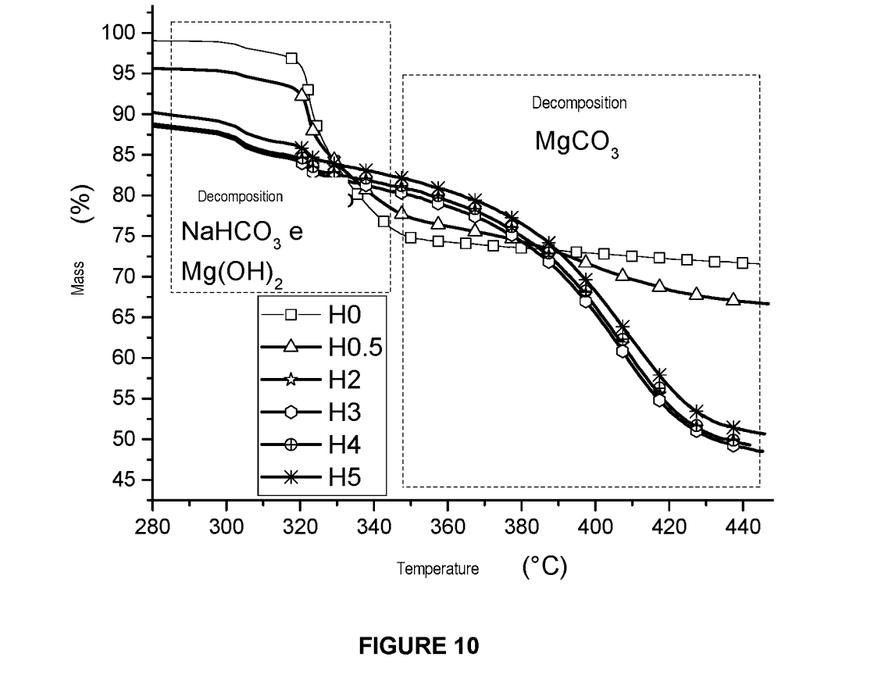
FIG. 10 shows the steps of decomposition of the saturated material for regeneration thereof, up to a temperature of 450° C.

During the absorption process performed with sample 1 (example 1) 6 samples were collected within the absorption period for analysis and execution of the regeneration process. Each sample was subjected to a heating procedure at a constant rate of 5° C./min until all the $CO_2$ contained was released. FIG. 10 shows the thermogravimetric curves (TG) collected for sample 1. The TG curve stands out for the presence of two stages of decomposition. The first corresponds to the decomposition of the remaining Mg $(OH)_2$ and $NaHCO_3$ formed during the absorption process. The second decomposition step, which occurs above 350° C., corresponds to the decomposition of the magnesium carbonate formed in each monitored time interval. It is observed that for sample HO (initial instant) there is no second decomposition, since there is still no $MgCO_3$ in the system. However, for samples H3 (3 hours) H4 (4 hours) and H5 (5 hours) the second step is remarkably highlighted, while the first step becomes less representative as the Mg $(OH)_2$ content is extremely low (<10%) due to the conversion of oxide to carbonate. After the temperature of 450° C. all absorbed $CO_2$ was released, regenerating the absorbent material.

After thermal decomposition, the ceramic material is cooled between 30 and 100° C., preferably 80° C. and added water, under constant stirring, for the correction of moisture content between 7 to 30%, preferably 17%.

The invention claimed is:

1. A process for producing a ceramic material, comprising the following steps:
    (a) solubilizing 23 to 360 g of alkali carbonate in 500 to 1,000 mL of water, wherein the alkali carbonate is $Na_2CO_3$, $K_2CO_3$, or a combination thereof;
    (b) adding 200 to 800 g of alkaline earth metal oxide or hydroxide;
    (c) adding a binding agent to form a mixture;
    (d) homogenizing the mixture obtained in step (c) for 5 to 30 minutes to form a clay;
    (e) removing, and optionally molding the clay obtained in step (d) for 1 to 3 hours;
    (f) drying the clay at a temperature from 50° C. to 150° C., preferably 80° C., for a period of 3 to 48 hours.

2. The process of claim 1, wherein 87 g of alkali carbonate is solubilized in 500 to 1,000 mL of water.

3. The process of claim 1, wherein 300 g of alkaline earth metal oxide or hydroxide is added.

4. The process of claim 1, wherein the mixture is homogenized for 10 minutes.

5. The process of claim 1, wherein the clay is molded for 1 hour.

6. The process of claim 1, wherein the clay is dried for 24 hours.

7. The process of claim 1, wherein the alkaline earth metal oxide or hydroxide in step (b) is selected from the group consisting of: magnesium oxide (MgO), magnesium hydroxide ($Mg(OH)_2$), calcium oxide (CaO), and calcium hydroxide ($Ca(OH)_2$).

8. The process of claim 1, wherein the binding agent in step (c) is selected from the group consisting of: calcium oxide (CaO), Portland cement, calcium sulfate ($CaSO_4$) and ferrous sulfate ($FeSO_4$).

9. The process of claim 1, wherein the drying in step (f) occurs in the presence of nitrogen and in the absence of air and carbon dioxide, in a closed chamber.

10. A process for regenerating ceramic material comprising the following steps:
    (a) thermally decomposing a saturated absorbent ceramic at a temperature of 350° C. to 800° C. for a period of 2 to 8 hours for release of an acid gas;
    (b) cooling the ceramic material at a temperature from 30 to 100° C.;
    (c) adding water under constant stirring to adjust the moisture content of the ceramic material to 7 to 30%.

11. The process of claim 10, wherein the temperature for the release of the acid gas in step (a) is 450° C.

12. The process of claim 10, wherein the ceramic material is cooled to 80° C.

13. The process of claim 10, wherein the moisture content of the ceramic material is adjusted to 17%.

14. A ceramic material produced according to the process of claim 1.

15. The ceramic material of claim 14, wherein the ceramic material is molded into compact blocks, cast blocks (bricks), or pellets.

16. An absorption process for absorbing an acidic gas, comprising exposing the acidic gas to the ceramic material of claim 14.

17. The absorption process of claim 16, wherein the absorption process occurs in a solid preformed bed of the ceramic material or in a fluidized bed of the ceramic material and excess water.

* * * * *